July 20, 1965    A. E. TROLIO    3,196,445
ULTRA-MINIATURE LIGHT SOURCE AND RECORDER USED THEREWITH
Filed May 15, 1962    3 Sheets-Sheet 1
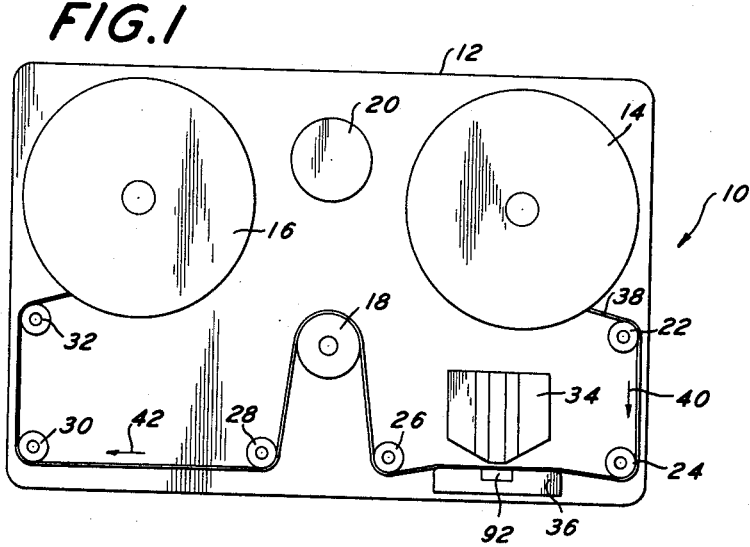
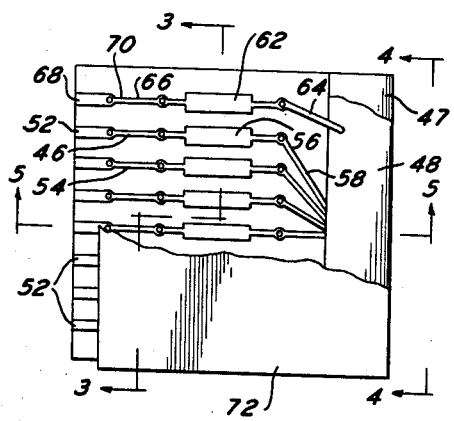
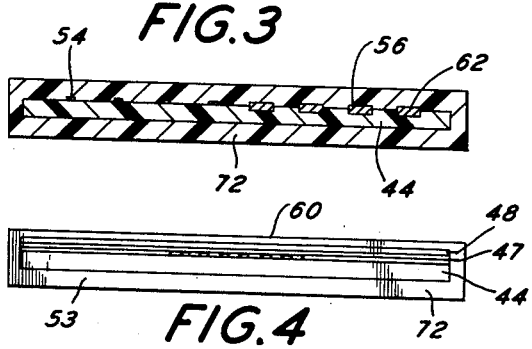
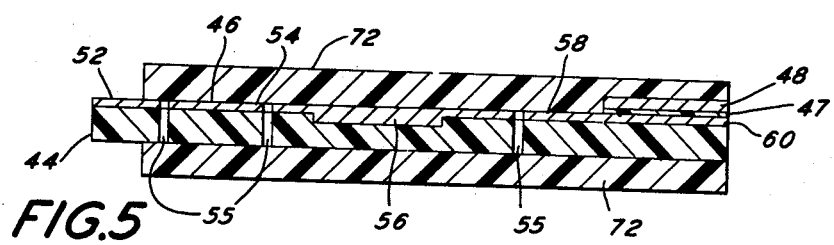
INVENTOR.
ANDREW E. TROLIO
BY
Caesar and Rivise
ATTORNEYS INVENTOR.
ANDREW E. TROLIO
BY
Caesar and Rivise
ATTORNEYS

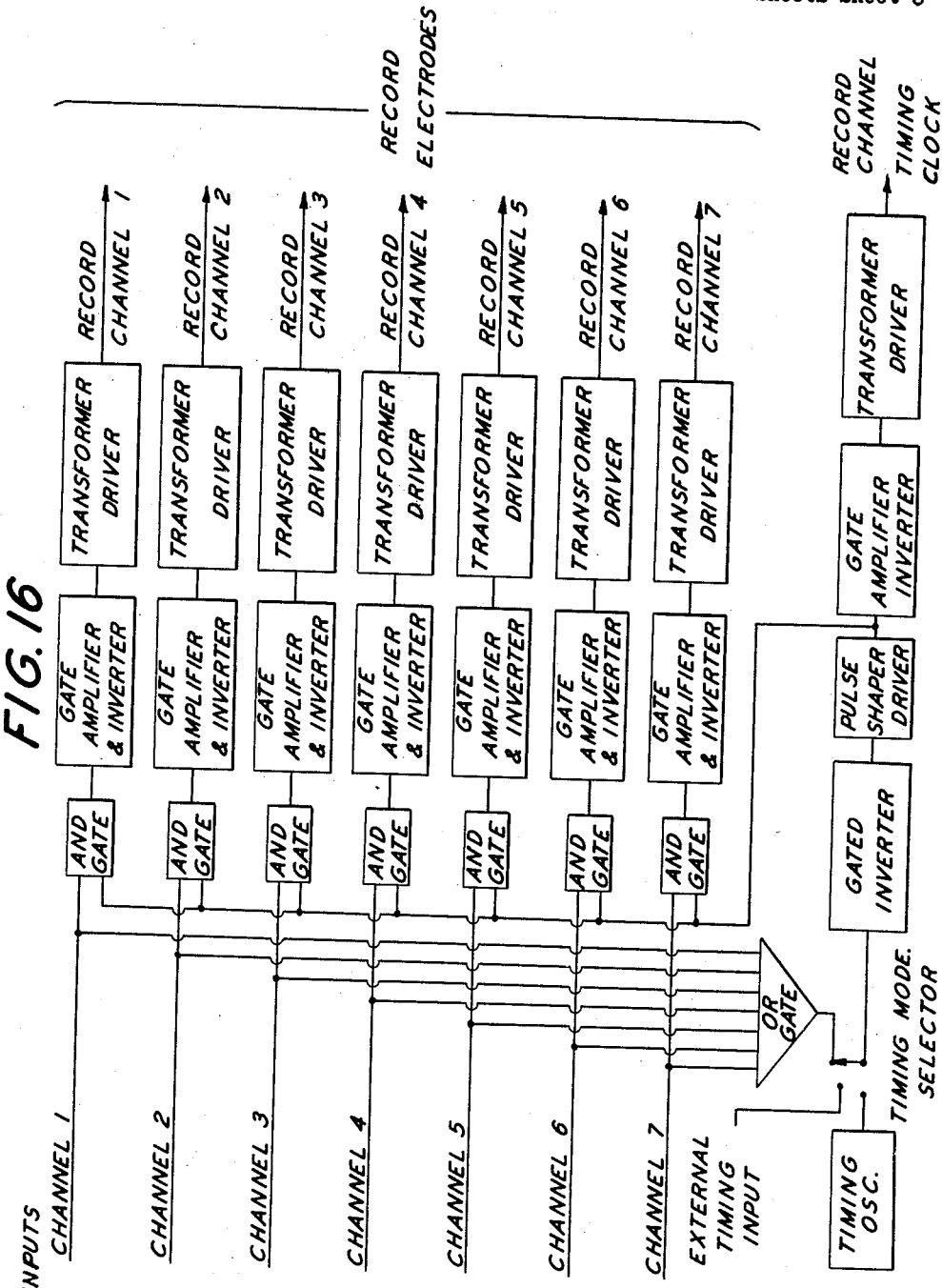

United States Patent Office 3,196,445
Patented July 20, 1965

3,196,445
ULTRA-MINIATURE LIGHT SOURCE AND
RECORDER USED THEREWITH
Andrew E. Trolio, Broomall, Pa., assignor to Adtrol
Electronics, Inc., Philadelphia, Pa., a corporation of
Pennsylvania
Filed May 15, 1962, Ser. No. 196,555
18 Claims. (Cl. 346—1)

This invention relates to an ultra-miniature light source and recorder used therewith and has at its objective the provision of a new and improved device of this general class.

A prime object of the present invention is to provide a recorder which will apply information to a photographic media simultaneously with the exposure of the photographic media to an object or a scene. The usual practice heretofor has been to expose the photographic media and thereafter apply the necessary information. Such a practice is generally tedious and difficult and is greatly magnified when very high speed photography is involved.

Recorders previously proposed have been highly complex and expensive and have utilized cumbersome components of large physical size requiring high power. Other types employing a lens and shutter operation are equally complex and ineffective in performance and speed of recording.

Another attempt to solve the foregoing problem was made in Schwertz Patent No. 2,978,968 wherein silent invisible electrostatic charges are deposited upon the surface of a photographic web in an effort to achieve high speed printing. Such a device, however, requires spaced electrodes to be positioned on both sides of the photographic media and further requires contact to be made with one of the electrodes. With the present invention the problems of spacing and handling are essentially eliminated and there is no problem of special alignment in connections therewith. Furthermore, the present invention will record at very high speeds information from digital inputs whenever the photographic media must be exposed at a very high speed. Moreover, the recorded information can be in several formats such as a digital code, in alphanumeric form or in the plotting of oscillographic analog inputs through an analog to a digital converter. The recorded information could be interpreted after processing the light sensitive median either visually, by optical reading or through a photoelectric process.

It is accordingly an object of the present invention to provide an ultra-miniature light source and recorder used therewith which can provide printing on a tape travelling at high speeds in excess of sixty miles an hour or print words at the rate of ten thousand words per minute.

It is a further object of this invention to provide an ultra-miniature light source and recorder used therewith which is relatively simple in construction, economical to manufacture and which is relatively maintenance free.

A still further object of this invention is to provide an ultra-miniature light source and recorder used therewith which will print at extremely high speeds characters which are not blurred and which are easily discernible.

Yet another object of the invention is to provide an ultra-miniature light source and recorder used therewith which is extremely small in size employing ultra-miniature light sources and having very low power requirements.

Still a further object of the invention is to provide an ultra-miniature light source and recorder used therewith with a simplicity of design and construction which affords a very reliable means of recording with a minimum number of components to service or maintain and which have an indefinite life.

A still further object of the present invention is to provide high speed printing on light sensitive paper without the need of a complex light focusing lens or shutters.

Still another object of the present invention is to provide an ultra-miniature light source and recorder used therewith which is extremely small in size thereby permitting an extremely high packing density of the light sources.

Still another object of the present invention is to provide an ultra-miniature light source and recorder used therewith which utilizes light emanations, such as an arc or glow created in an electrical breakdown occurring in less than one microsecond.

A further object of the present invention is to provide an ultra-miniature light source and recorder used therewith which directly utilizes an input signal to create an electrical breakdown without high power consumption and without requiring additional buffering or amplifying.

A still further object of the present invention is to provide an ultra-miniature light source and recorder used therewith which can be made so small that it can be used to record information while the film is being exposed in high or low speed photographic cameras or processes.

Yet another object of the present invention is to provide an ultra-miniature light source and recorder used therewith wherein the electronic section thereof is located remotely from the printing electrodes which are mounted for use in connection with a camera for titling film or recording other information simultaneously with the exposure of the film thereby eliminating the need for data correlation at a later time prior to the processing of the exposed light sensitive media.

A still further object of the present invention is to provide an ultra-miniature light source and recorder used therewith which includes a group of electrodes which may be selected singly or in groups to record a variety of characters.

The foregoing as well as other objects of the invention are achieved by providing an ultra-miniature light source and recorder used therewith which includes a recording head having a plurality of trigger electrodes which are mounted in spaced relationship to a common reference or ground electrode. The trigger electrodes as a unit are separated from the ground electrode by means of a dielectric medium having high dielectric strength except along one extreme edge thereof when the exposed tips of the trigger electrodes and the exposed edge of the reference or ground electrodes are separated only by an air space.

Thus, a potential may be applied in certain of the trigger electrodes in order to cause a breakdown or arc originating from the exposed tip thereof and terminating in the reference or ground electrode.

Such an arc creates a light emanation such as a momentary flash of light which exposes light sensitive paper moving at very high speeds in close proximity thereto.

Other features and advantages of this invention will be discussed in greater detail and will be readily appreciated as the same becomes better understood by reference to the following detailed description when considered in connection with the accompanying drawings, wherein:

FIG. 1 is a top schematic view of the entire recording device including the recording head.

FIG. 2 is an enlarged top plan view of the recording head with portions cut away for the sake of clarity.

FIG. 3 is a sectional view taken along the lines 3—3 of FIG. 2.

FIG. 4 is a sectional view taken along the lines 4—4 of FIG. 2.

FIG. 5 is an enlarged sectional view taken along the lines 5—5 of FIG. 2.

FIG. 16 is a schematic diagram of an input circuit associated with the recording head of the present invention.

Figure 6:
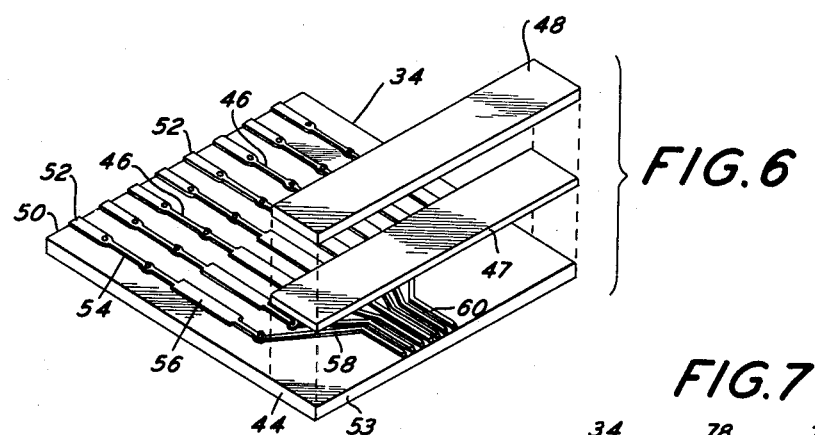
FIG. 6 is an exploded perspective view of the recording head showing the relationship between the di-electric media and the trigger and reference electrodes.

Referring now in greater detail to the various figures of the drawings wherein similar reference characters refer to similar parts, an ultra-miniature light source and recorder used therewith embodying the present invention is shown generally at 10 in FIG. 1. Device 10 basically comprises a support member 12 carrying the various components of the present ultra-miniature light source and recorder used therewith which includes supply reel 14, take-up reel 16, sprocket drive 18, motor 20 to drive both the reel 16 and the sprocket drive 18, idler rollers 22, 24, 26, 28, 30 and 32, recording head 34 and base 36.

As shown in FIG. 1, a light sensitive media 38, such as photographic paper or film, is led from supply reel 14 in the direction of arrow 40 about idler rollers 22 and 24 over base 36 to be selectively exposed by the momentary flashes of light emanating from recording head 34. The media 38 is preferably not in contact with the recording head. The media 38 is then led about idler roller 26 over sprocket drive 18 and then about idler rollers 28, 30 and 32 in the direction of arrow 42 to be rewound on the take-up reel 16.

The recording head 34 is shown in greater detail in FIGS. 2–8 and 14 and 15 to which reference is now made.

As best shown in FIG. 6, the recording head 34 basically comprises a substrate 44 which may have a thickness about .009 inch and which is preferably a material having the characteristics of high resistivity, very high arc resistance, low absorption, low loss and which is stable over a wide range of temperature. Examples of satisfactory materials for the substrate 44 include glass or epoxy glass materials.

As further shown in FIG. 6, a plurality of trigger circuits 46 are applied to the upper surface of the substrate 44. A dielectric layer 47 is placed over the leading portions of the trigger circuits 46 and a reference electrode 48 is positioned upon the dielectric layer 47.

As shown in FIG. 6, a plurality of trigger circuits 46 are applied to the upper surface of the substrate 44. The trigger circuits 46 extend from rear edge 50 of substrate 44 to front edge 53 thereof. Each circuit 46 includes a connector tab 52 adjacent rear edge 50, a first conductive strip 54 extends frontwardly from tab 52 to a resistance element 56 which is mounted close to the discharge end of circuit 46 to lower the circuit time constant and thereby increase the frequency response in view of the extreme speeds at which the trigger electrodes will operate. A second conductive strip 58 extends frontwardly from the resistance element 56 but is inclined inwardly to converge with the other second conductive strips 58 and extending frontwardly thereof to the front edge 53 of the substrate are the trigger electrodes 60.

The connector tabs 52 are plated, printed tabs to provide mechanical and electrical connection to the input circuitry as will be described hereinafter. The conductive strips 54 and 58 may be of copper or other conductive materials known in printed circuitry. Both the connector tabs and the conductive strips may be printed, deposited or etched in accordance with well known techniques. Securement of the various elements may be done by soldering or using openings 55 in substrate 44 as shown in FIG. 5.

The resistance element 56 may be of the standard subminiature types or may be deposited or screened and have a resistance value of from 100,000 ohms to one million ohms.

The trigger electrodes 60 have a height of about .003 inch with a spacing of about .016 inch and may consist of steel, copper or tungsten, for long life.

The dielectric layer 47 is laid upon the trigger electrodes 60 and is constructed of a material which has a high dielectric strength having a dielectric constant in the range of 8.6 to 10.6 at 300 megacycles. The dielectric material employed in layer 47 must have a very high melting point, must be highly arc resistant and should not carbonize when an arc is produced on its surface. Preferred materials are fused quartz, a high melting point glass or synthetic sapphires.

The reference electrode 48 is shown as a unitary piece but may be segmented for selection purposes. It is of a thickness of .003 inch and is preferably constructed of stainless steel or tungsten for long life.

A resistance element 62 (FIG. 2) similar to the resistance element 56 is placed in series with the reference electrode, as shown in FIG. 2. Conductive strips 64 and 66 lead the reference electrode circuit 70 back to a connector tab 68. Both resistance elements 56 and 62 serve to limit the current flowing in the respective circuits but do not affect the critical voltage which brings about the dielectric breakdown. It is preferred that resistance element 62 have a value of about one-tenth that of resistance element 56.

After the trigger circuits 46 and the reference electrode circuit 70 have been applied to the substrate 44 and the dielectric layer 47 and reference electrode 48 have been positioned in place and fused together with an epoxy or similar adhesive, the entire assembly is placed in a mold. The entire unit with the exception of portions of connector tabs 52, as shown in FIG. 2, is then encapsulated in epoxy material 72. After the epoxy material is cured, the unit is removed from the mold. It is to be noted, as shown in FIG. 4, that the leading tips of the electrode 60 are exposed so that any electrical discharges therefrom will occur in the ambient air. The leading tips of electrodes 60 are lapped or surface treated for long life. The recording head is now ready for testing and use.

Figure 14:
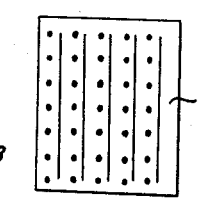
FIG. 14 is a schematic front view of five recording heads of the present invention compounded to form a matrix.
Figure 15:
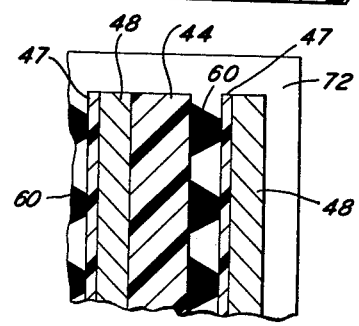
FIG. 15 is a detailed fragmentary view of a corner of the matrix of FIG. 14.

Alternatively, several substrates each carrying trigger circuits and a reference electrode circuit, a dielectric layer and the reference electrode may be sandwiched as illustrated in FIGS. 14 and 15 to form a matrix 73 for purposes as will be discussed hereinafter. The entire sandwich is encapsulated in epoxy material 72 and in this manner the packing density of the electrodes 60 is increased. Such a packing density may be of the order of 200 to the inch or with the trigger electrodes with a diameter of .001 inch placed on .005 inch centers. As an example the trigger electrodes may be spaced on 0.016 inch centers so that seven of them as shown in FIG. 14 will yield a character with a height of about one-eighth of an inch.

It is to be noted that the trigger electrodes when fired produce a light emanation of such a miniature size that a fine, pinpoint light source is created which requires no lens or auxiliary optical means to create a fine focus.

Of course, a lens or a prism system may be employed to change the size of the light flashed or to transmit the light flashes to a distant place.

It is to be emphasized that the light flashes created in the present invention do not require any filament or special gaseous medium. Tests have shown that the electrodes 60 may be fired at rates of 25,000 to 50,000 times per second and more using applied voltages of extremely short duration of 1,200 volts. Thus, the light sensitive material 38 must be moved past the electrode 60 at a very high speed so that the light sensitive material 38 will be exposed in accordance with the light emanations from the electrode 60 at the rate of 25,000 to 50,000 times per second. Of course, at lower speeds of material 38, a lower recording rate would be employed.

Figure 7:
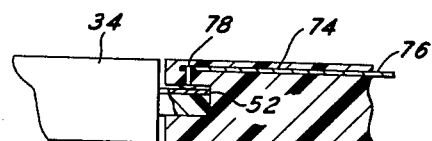
FIG. 7 is an enlarged detailed fragmentary view of the rear edge of the recording head, showing its attachment to an input circuit.
Figure 8:
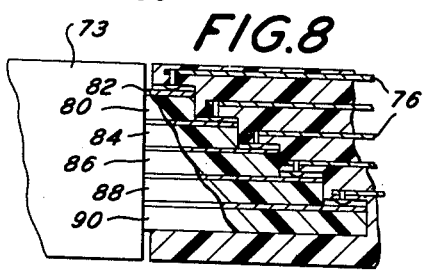
FIG. 8 is similar to FIG. 7 but shows a plurality of attachments when several recording heads are compounded to form a matrix.

As shown in FIGS. 7 and 8, the rear edge 50 with the connector tab 52 secured thereon will function as a male member in making the mechanical and electrical connection with a board 74 carrying input circuits 76 to recording head 34. A terminal contact 78 is associated with input circuit 76 on board 74 in order to make electrical contact with the connector tabs 52, as shown in FIG. 7. When the recording head is presented in the form of matrix 73 of FIG. 14, the rear edges thereof are formed in a step-like manner, as shown in FIG. 8. Each step corresponds to an element of the sandwich constituting the matrix 73.

As indicated in FIG. 8, the uppermost rear step 80 is relatively short and has a relatively short connector tab 82 secured thereto. It will be apparent that the upper step 80 will have seven trigger circuits 46 and a reference electrode circuit 70 formed thereon. Moreover, the lower steps 84, 86, 88 and 90 grow progressively larger, as illustrated in FIG. 8 and each step similarly has a set of trigger circuits 46 and a reference electrode circuit 70 formed thereon.

As shown in FIG. 8, each of the steps contain a connector tab for making electrical and mechanical contact with input circuits. Of course, other techniques may be employed in order to bring the input circuits 76 into electrical association with the trigger electrode circuits 46.

A schematic diagram of the input circuit 76 which may be associated with the recording head 34 is shown in FIG. 16 of the drawing. As there shown, each of the input circuits comprises a channel which emerges as a record channel which is fed to the recording head 34 through the input circuits 76. In order to produce various patterns, a single driver, for example, may be utilized to drive five or more electrode circuits as, for example, when a rectangular image is desired.

In use, various pulses are fed from the input circuit of FIG. 16 to certain of trigger electrodes 60 in logical sequences defining the informational output of a computer, etc. to recording head 34. These pulses contain a potential in excess of the critical potential necessary to cause a breakdown in the air at the area of the exposed tips of trigger electrodes 60. An electrical arc is thereby created between the particular trigger electrodes 60 to which the necessary potential has been applied and the reference electrode 48 which may be maintained at substantial ground potential.

The arc will occur only at the exposed tips inasmuch as the dielectric layer 47 has a dielectric strength in excess of that of the ambient air and thus will not permit an electric breakdown therethrough at a potential of 1,200 volts as has been applied to the electrode 60. It is to be noted that the electrical discharge from the trigger electrodes 60 to the reference electrode 48 lies substantially parallel to the front edge 53 of the substrate 44 and is of an extremely short length in order that the light emanations therefrom will be essentially a point source of light.

The light sensitive paper 38 is preferably somewhat spaced from the tips of the trigger electrodes 60 to the extent of about .025 inch to .031 inch.

FIGS. 9 to 13 show various data recording results achieved by virtue of the present invention.

Figure 9:
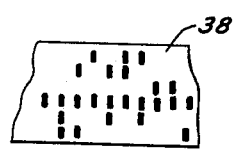
FIGS. 9 to 13 show various data recording results achieved by the present invention.

FIG. 9 shows a teletype code which was formed on the light sensitive paper 38. Each dark spot there shown constitutes an exposure created by a discharge from a trigger electrode 60. The exposures in vertical alignment occurred simultaneously whereas the horizontally spaced exposures occurred sequentially.

Figure 10:
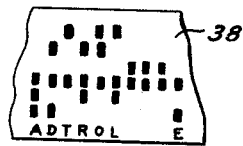

FIG. 10 shows coded characters, edge interpretable.

Figure 11:
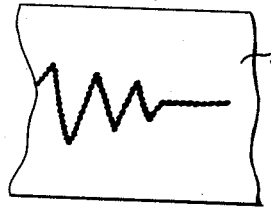

FIG. 11 shows an oscillographic curve.

Figure 12:
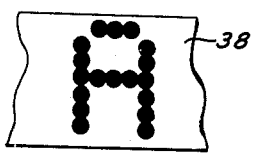

FIG. 12 shows an alphanumeric character formed using the matrix of FIG. 14.

Figure 13:
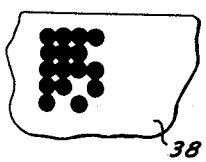

FIG. 13 is a storage character.

The light sensitive medium 38 may be a conventional photographic paper or film requiring chemical developments or may be of the direct print-out type.

The base 36 is preferably painted black and includes a black chamber 92 in order that the light emanating from the recording head 32 will be immediately absorbed thereby eliminating any improper exposure from reflected light.

It should be readily apparent that both the trigger electrodes 60 and the reference electrodes 48 are positioned on the same side as the light sensitive medium 38 to be exposed. Moreover, the ultra-miniature light source of the present invention operates on the principle of light exposure of a light sensitive medium, without the need for filaments, special gaseous media or enclosures. This, however, does not preclude the use of gaseous media or enclosures under special conditions such as high altitudes or in explosive atmospheres. However, special gaseous media or an enclosure are not essential to the operation of the present invention, and for this reason, the ultra-miniature light source of the present invention is extremely rugged and can withstand height, high temperature, vibration and shock.

The reference electrode 48 need not necessarily be maintained at ground potential but instead may receive a bias which will be coincidental to the potential placed upon the electrode 60. In such a case, the combined electrical potential will be in excess of the critical voltages, but the single voltages will be less than the critical amount.

The present invention has a wide range of applications including the recording of information fed to it at very high speeds. Furthermore, it can be employed to apply information to the film of a conventional camera as the film is being exposed or as a film titler. In any event, information may be applied to the photographic papers in a clear, distinct fashion at a rate of 10,000 words per minute or more.

Obviously many modifications and variations of the present invention are possible in the light of the above teachings. It is therefore to be understood that within the scope of the appended claims, the invention may be practiced otherwise than as specifically described.

What is claimed as the invention is:

1. The method of providing a permanent record at high speeds comprising providing a light sensitive medium, moving said light sensitive medium past a recording head at a high rate of speed, causing electric discharges which produce small point-like light emanations of short time duration in direct proximity to said light sensitive medium, thereby exposing portions of said light sensitive medium to attain characters of desired configuration comprised of said exposed portions.

2. The invention of claim 1 wherein said light sensitive medium is a photographic film which is being exposed essentially simultaneously with the emanation of said light.

3. A recorder employing an ultra-miniature light source comprising in combination a recording head and means to move a light sensitive medium past the recording head at a high rate of speed, said recording head including a plurality of trigger electrodes and at least one reference electrode, said electrodes being positioned on the same side of said media and being adapted to create light, said trigger and reference electrodes being separated by an interposed dielectric layer having a relatively high dielectric strength with the exception of certain exposed surfaces of the reference and trigger electrodes which are separated by a dielectric medium having a dielectric strength lower than said dielectric layer, said reference electrode being maintained at a potential for a time sufficient to create a plurality of small discharges creating light emanations of short time duration between said trigger electrodes and said reference electrode adjacent said exposed surfaces, said light emanations directly exposing portions of said light sensitive medium to create characters of desired configuration comprised of said exposed portions at a high rate of speed.

4. The invention of claim 3 wherein said recording head is in immediate proximity to said light sensitive medium.

5. The invention of claim 4 including a plurality of trigger electrodes position in parallel closely spaced relationship to each other and a single reference electrode in the form of an elongated strip and spaced from said trigger electrodes, thereby to form a recording head.

6. The invention of claim 5 wherein a plurality of said recording heads are sandwiched together to form a recording matrix, and said light sensitive medium being moved closely adjacent thereto.

7. The invention of claim 6 wherein said trigger electrodes are conductive strips secured to a substrate.

8. The invention of claim 7 including a resistance element placed in series with each of said trigger electrode in close proximity thereto, said resistance element being mounted close to said trigger electrode to lower the circuit time constant, said conductive strips connecting the trigger electrodes back to connector tabs secured adjacent the rear edge of the substrate.

9. The invention of claim 8 wherein said recording head is encapsulated in epoxy material with the exception of said connector tabs and said extreme tips.

10. The invention of claim 4 wherein said reference electrode is maintained at ground potential.

11. The invention of claim 6 wherein said light sensitive medium is spaced from 0.025 inch to 0.031 inch from said trigger electrodes.

12. The invention of claim 11 wherein said trigger electrodes are spaced on 0.016 inch centers.

13. The invention of claim 4 wherein the height of each trigger electrode is of the order of 0.003 inch.

14. The invention of claim 4 wherein the dielectric material between the trigger electrodes and the reference electrode has a dielectric constant ranging from 8.6 and 10.6 at 300 megacycles.

15. The invention of claim 14 wherein said dielectric material is selected from the group consisting of fused quartz, synthetic sapphires and high melting vitreous materials.

16. The invention of claim 4 wherein said recording head is in actual contact with said light sensitive medium.

17. The invention of claim 4 wherein said light sensitive medium is moved closely adjacent to said recording head with said light emanations being sufficiently sharp and sufficiently close to said light sensitive medium to produce exposed portions on said light sensitive medium of adequate focus.

18. The invention of claim 4 wherein said small light emanations constitute fine, pinpoint light sources and produce corresponding point portion exposures on said light sensitive medium.

References Cited by the Examiner
UNITED STATES PATENTS

| | | | |
|---|---|---|---|
| 2,692,178 | 10/54 | Grandadam | 346—74 |
| 2,714,841 | 8/55 | Demer et al. | 95—4.5 |
| 2,918,580 | 12/59 | Howell | 250—49.5 |
| 2,951,736 | 9/60 | Black | 346—1 |
| 3,050,731 | 8/62 | Usdin | 346—1 |
| 3,069,682 | 12/62 | Reese | 346—107 |
| 3,116,963 | 1/64 | Zen-iti Kiyasu et al. | 346—107 |

FOREIGN PATENTS

| | | |
|---|---|---|
| 895,283 | 5/62 | Great Britain. |

LEO SMILOW, *Primary Examiner.*